United States Patent
Bethouart et al.

(10) Patent No.: US 12,104,066 B2
(45) Date of Patent: Oct. 1, 2024

(54) PEELABLE INK COMPOSITION FOR POROUS SUBSTRATES

(71) Applicant: SOCIÉTÉ BIC, Clichy (FR)

(72) Inventors: Carine Bethouart, Clichy (FR); Aurelie Basset, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/907,419

(22) PCT Filed: Mar. 26, 2021

(86) PCT No.: PCT/EP2021/058050
§ 371 (c)(1),
(2) Date: Sep. 27, 2022

(87) PCT Pub. No.: WO2021/198118
PCT Pub. Date: Oct. 7, 2021

(65) Prior Publication Data
US 2023/0124990 A1   Apr. 20, 2023

(30) Foreign Application Priority Data

Mar. 31, 2020 (EP) .................... 20167377
Oct. 26, 2020 (EP) .................... 20306280

(51) Int. Cl.
*C09D 11/17* (2014.01)
*B43K 8/02* (2006.01)
*B43K 29/02* (2006.01)

(52) U.S. Cl.
CPC .............. *C09D 11/17* (2013.01); *B43K 8/024* (2013.01); *B43K 29/02* (2013.01)

(58) Field of Classification Search
CPC ........ C09D 11/10; C09D 13/00; C09D 11/18; C09D 11/17; C08L 53/02; C08L 75/04; B43K 8/024; B43K 29/02; B43K 5/02
USPC ........ 524/575, 589, 590; 523/160, 161, 164; 106/316, 31.64, 31.89
See application file for complete search history.

(56) References Cited

U.S. PATENT DOCUMENTS

| | | |
|---|---|---|
| 1,473,090 A | 11/1923 | Ferry |
| 2,069,462 A | 2/1937 | Rouse |
| 2,587,380 A | 2/1952 | Polynice |
| 2,637,900 A | 5/1953 | Thompson |
| 2,815,002 A | 12/1957 | Clell |
| 5,127,130 A | 7/1992 | Copito |
| 5,389,717 A | 2/1995 | Santini et al. |
| 5,413,428 A | 5/1995 | Kageyama |
| 5,855,442 A | 1/1999 | Keller |
| 6,344,498 B1 * | 2/2002 | Allison ............... C09D 11/16 401/209 |
| 6,458,192 B1 | 10/2002 | Tsujio |
| 6,979,142 B1 | 12/2005 | Chmelar |
| 9,409,438 B2 | 8/2016 | Ohtsuka |
| 10,315,833 B2 | 6/2019 | Erdmann et al. |
| 2005/0234150 A1 | 10/2005 | Omatsu et al. |
| 2006/0069183 A1 * | 3/2006 | Kurihara ............... C09D 11/17 523/160 |
| 2006/0153626 A1 | 7/2006 | Mook et al. |
| 2022/0063323 A1 | 3/2022 | Beaucher et al. |

FOREIGN PATENT DOCUMENTS

| | | | |
|---|---|---|---|
| CN | 107325630 A | 11/2017 | |
| EP | 0556668 A1 | 8/1993 | |
| EP | 0617718 A1 | 10/1994 | |
| EP | 2977416 A1 | 1/2016 | |
| EP | 2977416 B1 | 1/2016 | |
| JP | S5279614 A | 7/1977 | |
| JP | H05279614 A | 10/1993 | |
| JP | 3027484 B2 | 4/2000 | |
| JP | 2002265843 A | 9/2002 | |
| JP | 2003221542 A | 8/2003 | |
| JP | 2004 143881 * | 5/2004 | ............ E02D 29/02 |
| JP | 2004143213 A | 5/2004 | |
| JP | 2004143381 A | 5/2004 | |
| JP | 2009184279 A | 8/2009 | |
| JP | 2011230439 A | 11/2011 | |
| WO | 9312175 A1 | 6/1993 | |
| WO | 9410251 A1 | 5/1994 | |
| WO | 2005120862 A2 | 12/2005 | |

OTHER PUBLICATIONS

European Search Report issued in EP 20306280.7 on Mar. 10, 2021 (2 pages).
European Search Report issued in EP 213096161 on Jan. 17, 2022 (5 pages).
International Search Report issued in International Application PCT/EP2021/058050 on Jun. 18, 2021 (3 pages).
Big Duo Ball Pen / Highlighter, Refillable, Black, 6 Pen/Highlighters Amazon Listing, http://web.archive.org/web/20210826202048/https://www.amazon.com/BIC-Highlighter-Refillable-Black-Highlighters/dp/B00OF2PEA4/ef=cm_cr_arp_d_product_top (archived Aug. 26, 2021).
Extended European Search Report issued on Jan. 27, 2021, in European Patent Application No. 20305954.8 (8 pages).
Extended European Search Report issued on Mar. 29, 2021, in European Patent Application No. 20306280.7 (5 pages).
First notice of examination opinion issued in corresponding Chinese Application No. CN202180011200, issued Jul. 1, 2023.
Google Patents entry for JP3027484B2 (retrieved Aug. 27, 2021).
International Preliminary Report issued in International Application No. PCT/EP2021/058050, issued on Sep. 29, 2022.
Search Report issued in European U.S. Appl. No. 20/167,377, mailed on Aug. 25, 2020.
Search Report issued in International Application No. PCT/EP2021/058050, mailed on Jun. 28, 2021.

\* cited by examiner

*Primary Examiner* — David J Walczak
(74) *Attorney, Agent, or Firm* — Bookoff McAndrews, PLLC

(57) ABSTRACT

An aqueous peelable ink composition comprising at least one film-forming elastomeric polymer, at least one pigment, and water, wherein the film-forming elastomeric polymer is hydrogenated acrylonitrile butadiene rubber, and a method for preparing such an aqueous peelable ink composition.

20 Claims, No Drawings

PEELABLE INK COMPOSITION FOR POROUS SUBSTRATES

CROSS-REFERENCE TO RELATED APPLICATION(S)

This application is a National Stage Application of International Application PCT/EP2021/058050, filed on Mar. 26, 2021, now published as WO 2021/198118 A1, which claims priority to European Application No. 20306280.7, filed on Oct. 26, 2020, and claims priority to European Patent Application No. 20167377.9, filed on Mar. 31, 2020.

TECHNICAL FIELD

The present disclosure concerns an aqueous peelable ink composition, more specifically a writing ink composition, in particular for porous substrates. The disclosure also concerns a method for preparing such an aqueous peelable ink composition. A writing instrument comprising such an aqueous peelable ink composition and a method for writing on substrate, in particular on a porous substrate, are also part of the disclosure. Finally, the disclosure concerns a substrate, in particular a porous substrate, coated with an aqueous peelable ink composition according to the disclosure. The aqueous peelable ink composition of the disclosure includes a film-forming elastomeric polymer and one or more pigments dispersed in water. When the ink composition is applied to substrates, in particular to porous substrates, the water evaporates and the polymer(s) provide(s) a coalesced residue on the surface of the substrate. The ink composition is peelable in that the residue can be removed from the surface of the substrate, preferably paper surface, for some period of time after formation without leaving a visible residue or damaging the substrate. Hence, the initial color (first color) of the ink composition after writing on a substrate can be removed by peeling, and the written mark may change into a second color. Preferably, the first and second colors are different which means that they can be distinguished from each other by the human eye. The ink composition of the disclosure is particularly suitable for use with writing substrates, in particular porous substrates (also named porous surfaces) made, basically, of pressed, matted fibers, like paper or cardboard. The aqueous peelable ink composition of the disclosure is also storage-stable, easy to manufacture, and easy to apply.

The ink composition of the disclosure preferably has a low viscosity, preferably a viscosity ranging from 3 to 10 mPa·s, more preferably ranging from 3 to 7 mPa·s, and as a result is particularly suitable for use with standard felt-tip markers that rely on a capillary feed system to draw ink from a reservoir. Thus, the ink composition of the disclosure is suitable for use in felt-pens, highlighters, markers, which typically use colored pigments. One significant advantage to using the ink composition of the disclosure in markers is that when textbook pages are highlighted, the highlighted portions can be erased later when the book is used by another reader.

Furthermore, the ink composition of the disclosure can be included in one single writing instrument. This may allows having multiple color options within the same color mark, for example when the user takes notes, journal or draws to emphasize information or to make things stand out, which allows the user not to use multiple writing instruments.

BACKGROUND

Aqueous erasable writing ink compositions are known in the art such as in EP0556668B1 or JP03027484B2. Said aqueous ink compositions contain a film-forming elastomeric polymer and colorant. However, with this kind of erasable writing ink compositions, erasability may be difficult after a long period of time, and is thus sometimes not satisfactory. Furthermore, the peelability of the ink compositions of the prior art requires significantly high pressure to obtain a good color-changing. In addition, the colors obtained with the ink compositions of the prior art are generally not very vivid.

Color-changing ink compositions capable of changing the color of the ink by an eraser are known in the art such as in JP2002265843A or EP2977416B1. Said color-changing ink compositions contain a water-soluble resin, as well as pigment and dye. However, with this kind of color-changing ink compositions, peelability may be difficult after a long period of time, and is thus sometimes not satisfactory. Furthermore, the peelability of the ink compositions of the prior art requires significantly high pressure to obtain a good color-changing. In addition, the colors obtained with the ink compositions of the prior art are generally not very vivid.

Therefore, there is a need to find a new aqueous erasable ink composition, more specifically a new erasable writing ink composition, enabling to obtain a good deposit which has, in particular, a satisfactory color intensity (vividness), a good peelability by mechanical action particularly when used on porous substrates, preferably while avoiding an unwanted color loss due to a change in temperature and/or an unwanted color return. However, a minimum pressure shall be advantageously required in order to avoid involuntarily removal of the written mark, in particular for left-handed. In particular, efficient peelability of the written mark shall enable efficient removal of the initial color after peeling which means that the initial color is efficiently removed after peeling.

SUMMARY

The inventors have surprisingly found that the use of hydrogenated acrylonitrile butadiene rubber as a specific film-forming elastomeric polymer, in combination with at least one pigment dispersed in water, can resolve the above-mentioned problem. The peelable ink composition of the disclosure also presents the advantage of being peelable with fingers, thus using less waste than with conventional erasers. Furthermore, according to some embodiments, the aqueous peelable ink composition of the disclosure also presents the advantage of enabling a change of color, in particular by applying a low pressure (by the user).

In addition, the aqueous peelable ink composition of the disclosure enables obtaining vivid colors of written marks once applied, especially on porous substrates, more specifically the initial color of the deposit is vivid as well as the second color of the deposit (after peeling) according to embodiments allowing to obtain such second color.

An additional advantage of the disclosure is the possibility to obtain an aqueous peelable ink composition, optionally with color-changing, having a good cap-off time. The term "cap-off" designates the ability of the ink composition of the disclosure with color-changing of not drying up in the writing instrument, which means in particular that the writing instrument can be left open for longer period of time, preferably one hour or even several hours, in particular with removed cap, without drying up, or even more specifically more than one day, according to some embodiments.

DETAILED DESCRIPTION

Hereinafter, a detailed description of the present disclosure will be given. The specific embodiments are meant better illustrate the present disclosure, however, it should be understood that the present disclosure is not limited to these specific embodiments.

In the sense of the present disclosure, the expression "comprising a" should be understood as being synonymous with "comprising at least one".

In the sense of the present invention, the expressions "between . . . and . . . " or "ranging from . . . to . . . " should be understood as including the values of the limits.

For the purposes of the present disclosure, the term "peelable ink" (or "erasable ink") is intended to mean any ink which can be peeled (or rubbed) after writing, preferably by the use of a finger or a friction body wherein the friction body can be an eraser or a tissue. The written mark obtained, in particular on cellulosic fibers paper such as paper (printer paper for example) and cardboard, by this ink can therefore be peeled just after writing such as less than 10 seconds after writing, even a few days after writing, and also even one month after writing. More specifically, according to some embodiments, the written mark made with the ink can be peeled to change the initial color of the writing into another color (second color).

Hence, once applied the written mark made with the ink composition according to the disclosure can be erased by peeling (or rubbing) or alternatively its initial color (first color) can be changed into another color (second color). Therefore, according to a first specific embodiment of the disclosure, the ink composition of the disclosure is erasable. According to a second specific embodiment of the disclosure, the ink composition of the disclosure is peelable from a first color into a second color, which is advantageously different from the first color. Advantageously, according to this second embodiment, the initial color, as well as the second color (after peeling), are vivid.

For the purposes of the present disclosure, the term "erasable" or "peelable" should be understood as any written mark which can be peeled and/or rubbed after writing, preferably by the use of a finger or a friction body wherein the friction body can be an eraser or a tissue.

For the purposes of the present disclosure, the term "porous substrate" is intended to mean substrate that contains pores. The porous substrates have empty spaces or pores that allow external matter, like ink, to penetrate into the substrate.

Advantageously, the roughness of the substrate can be defined by its air permeability and measured by the standard ISO 8791 (unit: $mL \cdot min^{-1}$). In a preferred embodiment, the air permeability of the porous substrate of the disclosure ranges from 50 to 1,000 $mL \cdot min^{-1}$, preferably from 60 to 400 $mL \cdot min^{-1}$, and more preferably from 80 to 280 $mL \cdot min^{-1}$.

In particular, the porous substrate is chosen among porous substrate comprising cellulosic fibers such as paper, printer paper, or cardboard.

The ink composition according to the present disclosure is advantageously irreversibly erased. It is therefore an irreversible peelable ink composition. According to a preferred embodiment, the ink composition is an irreversible peelable color-changing ink composition. The term "color-changing ink" is intended to mean that once the color has changed, it is not possible to change it again, and in particular it is not possible to go back to the initial color (first color).

The ink composition according to the present disclosure is more specifically a writing ink. For the purposes of the present disclosure, the term "writing ink" is intended to mean any ink which is intended to be used in a writing instrument, and in particular in a felt-pen, a highlighter, a marker. A writing ink should not be confused with a printing ink which is used in printing machines and which does not have the same technical constraints, and thus the same specifications. Indeed, a writing ink must not contain solid particles of which the size is greater than the channels of the writing instrument, in order to avoid blocking them, which would inevitably lead to writing being irreversibly stopped. It must also dry sufficiently rapidly to avoid smudging the writing medium. It must also avoid the problems of migration (bleeding) over time. Thus, the ink composition according to the present disclosure will be suitable for the writing instrument for which it is intended.

The present invention therefore concerns an aqueous peelable ink composition comprising:
(a) at least one film-forming elastomeric polymer,
(b) at least one pigment, and
(c) water,
wherein the film-forming elastomeric polymer (a) is hydrogenated acrylonitrile butadiene rubber (HNBR).

According to some embodiments the aqueous ink composition of the disclosure may comprise at least a second film-forming elastomeric polymer (d), in particular which is different from hydrogenated acrylonitrile butadiene rubber (HNBR). More specifically the second film-forming elastomeric polymer (d) is styrene butadiene rubber (SBR).

Advantageously, the ink composition according to the disclosure is an aqueous ink composition, in particular an aqueous peelable ink composition.

In the sense of the disclosure, "film-forming" means a polymer capable of forming, by itself a macroscopically continuous film on a substrate, in particular on a porous substrate, and preferably a cohesive film.

In the sense of the disclosure, "elastomeric" means a polymer that displays rubber-like elasticity, i.e. a deformable, flexible polymer which has viscoelastic properties.

In the sense of the disclosure, a "polymer" is a compound (in particular a large molecule or a macromolecule) corresponding to the repetition of one or more units (these units being derived from compounds called monomers), and in particular the repetition of at least two repeating units, and preferably at least ten repeating units.

The film-forming elastomeric polymer (a) allows the fixation of the ink composition of the disclosure on the paper, and therefore avoids the written mark (deposit) of the ink to be peeled (i.e. removed) by simply brushing it with another sheet of paper while being erasable or while being able to change its initial change color (first color) to another one (second color) (when a colorant is also present in the ink composition of the disclosure) by peeling with a friction body. The film-forming elastomeric polymer (a) of the disclosure is hydrogenated acrylonitrile butadiene rubber (HNBR), for example commercially available under the name Zetpol® 2230LX (Zeon Corporation), Therban (Brenntag), as well as mixtures thereof.

Advantageously, the film-forming elastomeric polymer (a) represents at least 8% by weight, preferably at least 12% by weight, more preferably at least 16% by weight, and even more preferably at least 20% by weight, relative to the total weight of the ink composition. In a preferred embodiment, the content of film-forming elastomeric polymer (a) ranges from 8 to 36% by weight, and more specifically from 12 to 32% by weight, relative to the total weight of the ink composition.

According to some embodiments, the aqueous ink composition of the disclosure may comprise at least a second film-forming elastomeric polymer (d).

More specifically the second film-forming elastomeric polymer (d) is styrene butadiene rubber (SBR), for example commercially available under the name Europrene® Latice 084 (Versalis), Europrene® Latice B010 (Versalis).

Advantageously, the weight ratio of the at least first film-forming elastomeric polymer (a) to the at least second film-forming elastomeric polymer (d), in particular of the hydrogenated butadiene rubber (HNBR) to the styrene butadiene rubber (SBR) is ranging from 1:5 to 5:1, in particular a weight ratio from 1:4 to 3:1.

Advantageously, the total content of film-forming elastomeric polymers ((a)+(d)) represent at least 8% by weight, preferably at least 12% by weight, more preferably at least 16% by weight, relative to the total weight of the ink composition.

In a preferred embodiment, the total content of film-forming elastomeric polymers ranges from 8% to 36% by weight, and more preferably from 12 to 32% by weight, even more preferably 12 to 25% by weight, relative to the total weight of the ink composition.

Advantageously, the total content of the film-forming elastomeric polymer (d) ranges from 3 to 25% by weight, preferably ranges from 6 to 20% by weight, relative to the total weight of the ink composition.

According to another embodiment, the ink composition, in particular the aqueous peelable ink composition, may further comprise at least one third film-forming elastomeric polymer.

The ink composition, in particular the aqueous peelable ink composition of the present disclosure further comprises a pigment (b) which gives the color to the ink composition. The term "pigment" should be understood as meaning white or colored, mineral or organic particles of any form, which are insoluble in the medium in which they are solubilized, and which are intended to color the ink composition once applied on a substrate, in particular on a porous substrate, before peeling. The pigments (b) are also generally contained in a dispersion, where the grinding down or particle size reduction is accompanied by appropriate dispersants to achieve stable dispersions. The pigment (b) is preferably a pigment dispersion, more preferably chosen in the group consisting of pigment black 7 (such as Flexiverse III black 7 by SunChemical®), pigment blue 15:3 (such as APE FRE BL 15:3 DISP by SunChemical®), pigment red (such as Pigment red 210 by SunChemical®), pigment green 7 (such as Sunsperse Eco green, Flexiverse FD Green, Flexiverse Green 7, Flexiverse HC GRN 7 by SunChemical®), and mixtures thereof. In a preferred embodiment, the pigment (b) is chosen in the group consisting of pigment black 7 (such as Flexiverse III black 7 by SunChemical®), pigment blue 15:3 (such as APE FRE BL 15:3 DISP by SunChemical®), and mixtures thereof.

More specifically the pigment (b) is preferably a pigment dispersion, more specifically chosen in the group consisting of pigment violet 23 (such as Cellusperse® A Violet 4 BP by SunChemical®), pigment yellow 74 (such as FG Yellow 1SL by SunChemical®).

According to a preferred embodiment, the diameter of the pigment in a pigment dispersion is less than 1 μm, and preferably less than 0.7 μm.

Advantageously, the content of pigment dispersion (b) ranges from 0.1 to 10% by weight, and preferably from 0.5 to 7% by weight, relative to the total weight of the ink composition.

Advantageously, the content of pigment (b) ranges from 10 to 50% by weight, relative to the total weight of the pigment dispersion. More specifically, the content of pigment (b) ranges from 30 to 50% by weight, preferably from 35 to 45% by weight, and more preferably from 38 to 45%, relative to the total weight of the pigment dispersion.

The aqueous peelable ink composition of the disclosure may further comprise at least one dye, in particular a mixture of dyes, solubilized in water. According to this specific embodiment, the ink composition of the disclosure is color-changing, which means that a written mark made with the ink composition of the disclosure can change from a first color into a second color by mechanical action (i.e. by peeling the first color).

The term "dyes" should be understood as meaning colored, mineral or organic particles of any form, which are soluble in the medium in which they are solubilized, and which are intended to color the ink composition once applied on a substrate, in particular on a porous substrate, after peeling. The presence of a dye in the ink composition of the disclosure allows a change of the initial color of the writing in another color by peeling with a finger or a friction body. The dye may be chosen for example in the group consisting of direct dyes (for example C.I direct black 17, 19, 22, 32, 38, 51, 71; C.I direct yellow 4, 26, 44, 50; C.I direct red 1, 4, 23, 31, 37, 39, 75, 80, 81, 83, 225, 226, 227; C.I direct blue 1, 15, 41, 71, 86, 87, 106, 108, 199, and the like), acid dyes (for example C.I acid black 1, 2, 24, 26, 31, 52, 107, 109, 110, 119, 154; C.I acid yellow 1, 7, 17, 19, 23, 25, 29, 38, 42, 49, 61, 72, 78, 110, 127, 135, 141, 142; C.I acid red 8, 9, 14, 18, 26, 27, 33, 35, 37, 51, 52, 57, 82, 83, 87, 92, 94, 111, 129, 131, 138, 186, 249, 254, 265, 276; C.I acid violet 15, 17, 49; C.I acid blue 1, 3, 7, 9, 15, 22, 23, 25, 40, 41, 43, 62, 78, 83, 90, 93, 100, 103, 104, 112, 113, 158; C.I acid green 3, 9, 16, 25, 27; C.I acid orange 56, and the like), food dyes (such as C.I. food yellow 3, and the like), Malachite green (C.I 4200) Victoria blue FB (C.I. 44045) methyl violet FN (C.I. 42535), rhodamine F4G (C.I. 45160), and rhodamine 6GCP (C.I 45160), and mixtures thereof.

When present, the content of the dye(s) may range from 0.1 to 10% by weight, advantageously from 0.2 to 8% by weight, and more advantageously from 0.3 to 5% by weight, by weight relative to the total weight of the ink composition.

The ink composition, more specifically aqueous peelable ink composition of the disclosure also contains water (c) as the solvent.

Advantageously, the content of water (c) in the aqueous peelable ink composition of the disclosure ranges from 10 to 80% by weight, more advantageously from 10 to 70% by weight, and even more advantageously from 20 to 60% by weight, relative to the total weight of the ink composition.

The ink composition, more specifically aqueous peelable ink composition of the disclosure may also contain at least one release agent. The release agent of the disclosure is free of silicone, and is advantageously a polyoxyethylene sorbitan ester, more advantageously a polyoxyethylene sorbitan fatty acid ester, even more advantageously a polyoxyethylene sorbitan fatty acid ester with a chain of fatty acid in $C_5$-$C_{25}$, and even more advantageously a polyoxyethylene sorbitan fatty acid ester with a chain of fatty acid in $C_8$-$C_{16}$. In a particularly preferred embodiment, the release agent of the disclosure is a polyoxyethylene sorbitan monolaurate. The polyoxyethylene sorbitan ester comprises repeating units of ethylene oxide, preferably at least 20 repeating units of ethylene oxide. In a particularly preferred embodiment, the polyoxyethylene sorbitan monolaurate has a weight average molecular weight $M_w$ ranging from 800 to 2,000 g·mol$^{-1}$, more advantageously from 1,000 to 1,500 g·mol$^{-1}$, and even more advantageously of 1,300 g·mol$^{-1}$, measured by Gel Permeation Chromatography (GPC).

Advantageously, the content of release agent in the ink composition, more specifically in the aqueous peelable ink composition of the disclosure, ranges from 0.1 to 5% by weight, more advantageously from 0.1 to 3% by weight, and even more advantageously from 0.2 to 3% by weight, relative to the total weight of the ink composition.

The ink composition, more specifically the aqueous peelable ink composition of the disclosure, may further contain at least one plasticizer. The plasticizer of the disclosure is chosen in the group consisting of alcohols, preferably glycerin, benzoate esters, diisobutyrate esters such as trimethyl pentanyl diisobutyrate, and mixtures thereof, and more preferably glycerin, benzoate esters, and mixtures thereof, still more preferably glycerin. According to a preferred embodiment, the aqueous peelable ink composition of the disclosure comprises as plasticizer a mixture of at least one ester and at least one alcohol, wherein the at least one alcohol preferably has a boiling point higher than 160° C., and more preferably is glycerin (boiling point: 290° C.).

Advantageously, the content of plasticizer in the ink composition, more specifically in the aqueous peelable ink composition of the disclosure, ranges from 1 to 25% by weight, and more advantageously from 8 to 20% by weight, relative to the total weight of the ink composition.

Advantageously, the presence of alcohol such as glycerin lets to improve the cap-off time of the composition.

According to an advantageously embodiment, the ink composition, in particular the aqueous peelable ink composition, further comprises urea and/or urea derivative(s) and mixtures thereof. More specifically the ink composition may further comprise urea and/or urea derivative(s) and mixtures thereof when the ink composition comprises at least a second film-forming elastomeric polymer (d), more specifically chosen from styrene butadiene rubber (SBR).

More specifically, the addition of such compound(s) can be used to improve the cap-off the composition, in particular when used in addition to alcohol such as glycerin.

Advantageously, the total content of urea and/or urea derivative(s) ranges from 1 to 25% by weight, and more advantageously ranges from 8 to 20% by weight, relative to the total weight of the ink composition.

In particular, the urea derivative(s) may be chosen among alkylene urea derivative(s) and/or thio urea derivative(s) and mixtures thereof, more specifically the urea derivative(s) may be chosen among ethylene urea, propylene urea, thio urea and mixtures thereof.

In particular, urea and/or urea derivative(s) may be used alone or as a mixture of two or more thereof.

Advantageously, the ink composition, in particular the aqueous peelable ink composition, of the disclosure comprises at least one first plasticizer and at least urea and/or urea derivative(s), advantageously the first plasticizer comprising glycerin.

The aqueous ink composition, in particular the aqueous peelable ink composition according to the present disclosure may further comprise additional additive(s) known by the skilled person to be usable in aqueous ink compositions, advantageously selected in the group consisting of antimicrobial agents, antifungal agents, dispersing agents, wetting agents, pH regulators, and mixtures thereof.

Advantageously, the content of additional additive(s) in the ink composition of the disclosure ranges from 0.1 to 30% by weight, more advantageously from 0.1 to 20% by weight, and even more advantageously from 0.1 to 10% by weight, relative to the total weight of the ink composition.

The aqueous peelable ink composition of the disclosure may advantageously contain at least one antimicrobial agent such as methyl paraben, phenoxyethanol, isothiazolinone, 1,2-benzoisothiazolin-3-one, 2-methyl-4-isothiazolin-3-one, and mixtures thereof.

Advantageously, the antimicrobial agent is present in the aqueous peelable ink composition of the disclosure in a content ranging from 0.1 to 5% by weight, and more advantageously from 0.1 to 2% by weight, relative to the total weight of the ink composition.

The aqueous peelable ink composition according to the present disclosure may also contain a pH regulator, preferably chosen in the group consisting of ammonia, urea, monoethanolamine, diethanolamine, triethanolamine, alkali metal salts of phosphoric acid such as tripolyphosphate, sodium carbonate and hydroxides of alkali metals such as sodium hydroxide, still more specifically it is urea.

The ink composition according to the present disclosure is peelable, advantageously by peeling such as by mechanical friction, in particular by the use of a finger or a friction body wherein the friction body is an eraser or a tissue. The ink composition of the disclosure is therefore peelable by the use of the heat generated by the friction of the finger or the eraser.

Advantageously, the eraser used as a friction body may be chosen in the group consisting of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

Advantageously, the tissue used as a friction body may be chosen in the group consisting of cotton fabric, synthetic fabric and leather fabric, and more advantageously cotton fabric.

The aqueous peelable ink composition according to the present disclosure has advantageously a viscosity of 3 to 10 mPa·s, and more advantageously of 3 to 7 mPa·s, measured at 20° C. with a Shell Cup #1 marketed by NORCROSS® Corporation. When the viscosity is less than 3 mPa·s, the pigment particles may settle more rapidly in the composition with a risk of ink leakage. Furthermore, when the viscosity is higher than 10 mPa·s, the flow rate of the ink composition is too low and any line was not written.

The present disclosure also concerns a method for preparing an ink composition, in particular an aqueous peelable ink composition according to the disclosure, comprising the steps of:
(i) under stirring, adding at least one film-forming elastomeric polymer (a), and the optional dye, to water (c),
(ii) under stirring, adding at least one pigment (b), and the optional at least one release agent and at least one plasticizer, to the mixture obtained in step (i), and
(iii) under stirring, adding the optional additives to the mixture obtained in step (ii).

More specifically when the ink composition comprises at least a second film-forming elastomeric polymer, more specifically chosen from styrene butadiene rubber (SBR), the second film-forming elastomeric polymer (d) is added in step (i).

The film-forming elastomeric polymer (a), pigment (b), water (c), as well as the optional second film-forming elastomeric polymer (d), release agent, dye, plasticizer and additive(s), are as defined above for the ink composition, in particular the aqueous peelable ink composition according to the disclosure.

During steps (i), (ii) and (iii), the ink ingredients are mixed under stirring at room temperature (20° C.), advantageously at a stirring speed ranging from 200 to 700 rpm, and more advantageously at a stirring speed of 500 rpm.

The ink composition obtained in steps (i), (ii) and (iii) can be homogenized during a certain period of time ranging from 3 to 40 minutes, preferably from 3 to 20 minutes, and preferably from 5 to 10 minutes.

The present disclosure also concerns a writing instrument, in particular a pen such as a felt-pen, a highlighter, a marker, and more advantageously it is a writing felt-pen, a coloring felt-pen, a highlighter, containing an ink composition according to the invention.

Advantageously, the writing instrument according to the present invention contains an eraser, in particular located on the cap or on the non-writing end of the writing instrument. More particularly, the eraser consists of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

According to a preferred embodiment, the writing instrument according to the present disclosure comprises:

an axial barrel containing an ink composition, more specifically an aqueous peelable ink composition according to the disclosure, and a pen body which delivers the ink composition, more specifically an aqueous peelable ink composition stored in the axial barrel.

Another object of the present disclosure is a method for writing on a substrate, in particular on a porous substrate, comprising the step of applying an ink composition according to the disclosure to a substrate, in particular a porous substrate, preferably comprising cellulose fibers, and more preferably chosen in the group consisting of paper, printer paper or cardboard. The method for writing on a substrate, in particular on a porous substrate, may further comprise the step of erasing by peeling the writing mark, preferably by peeling the writing with a finger or with a friction body wherein the friction body is an eraser or a tissue, said first and second colors being different from each other, in order to erase the writing (if absence of dye in the ink composition) or to change the initial color (first color) of the writing into another color (second color) (if presence of dye in the ink composition). Hence, in case of absence of dye(s) in the ink composition, the second color is colorless, in particular as the color of the ink deposit is removed (the writing is erased).

Finally, another object of the present disclosure concerns a substrate coated with an ink composition, in particular an aqueous peelable ink composition according to the present disclosure, wherein the substrate is preferably a porous substrate, preferably chosen in the group consisting of paper, printer paper, or cardboard.

In addition to the foregoing, the disclosure also comprises other provisions which will emerge from the additional description which follows, which relates to the preparation of ink compositions, in particular aqueous peelable ink compositions according to the present disclosure and comparative examples.

EXAMPLES

Example 1: Preparation of a Grey Aqueous Peelable Ink Composition According to the Disclosure An aqueous peelable ink composition according to the present disclosure comprising the ink ingredients of Table 1 was prepared.

TABLE 1

| Trade name | Chemical name | Function | Composition 1 (% by weight) |
|---|---|---|---|
| Water | | Solvent | 33% |
| Zetpol ® 2230LX | HNBR (dry extract: 40.5%) | Film-forming resin | 55% (22% of pure HNBR) |
| Benzoflex ™ 2088 | Benzoate ester | Plasticizer | 10% |
| PAT ®-662/BNF | Polyoxyethylene sorbitan monolaurate | Release agent | 0.50% |
| Acticide PHE | Phenoxyethanol | Biocide | 0.50% |
| Flexiverse III Black 7 - LGD 2000 | Pigment dispersion | Black pigment dispersion | 1% |
| Total | | | 100% |

For a preparation of 1 kg, 330 g of water were introduced at room temperature in a dissolver DISPERMAT® LC75 (dissolver disc Ø 60 mm), under agitation (stirring speed: 500 rpm). Then, 550 g of Zetpol® 2230LX (Zeon Corporation) were added at the same stirring speed. The % of solid HNBR in Zetpol® 2230LX (Zeon Corporation) represents 40.5% (dry extract), and the % of solid HNBR in the final ink composition is thus of 22% by weight. After 5 minutes, 100 g of Benzoflex™ 2088 (EASTMAN) were slowly introduced. After 5 minutes under the same stirring speed, 5 g of PAT®-662/BNF (Würtz) were added. After 5 minutes under the same stirring speed, 50 g of a black pigmented dispersion Flexiverse III Black 7—LGD 2000 (SunChemical®) were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the following procedure:

1. Dip the Shell Cup in the ink composition until the cup is completely filled with ink composition.
2. Take the Shell Cup out of the fluid and start the timer simultaneously.
3. Stop the timer as soon as the fluid does not flow out any more. The time displayed on timer is reported as the Shell Cup viscosity at 20° C. of the fluid.
4. Clean and dry the Shell Cup.
5. Repeat steps 1 to 5 with the same fluid two times.
6. Report the average viscosity of the three measures.
7. Store the Shell Cup at 20° C.

The viscosity of the aqueous peelable ink composition of example 1 measured according to this procedure was: 5.3 mPa·s.

Example 2: Preparation of a Grey Aqueous Peelable Ink Composition According to the Disclosure (Without Release Agent)

An aqueous peelable ink composition according to the present disclosure comprising the ink ingredients of Table 2 was prepared.

TABLE 2

| Trade name | Chemical name | Function | Composition 2 (% by weight) |
|---|---|---|---|
| Water | | Solvent | 33.5% |
| Zetpol® 2230LX | HNBR (dry extract: 40.5%) | Film-forming resin | 55% (22% of pure HNBR) |
| Benzoflex™ 2088 | Benzoate ester | Plasticizer | 10% |
| Acticide PHE | Phenoxyethanol | Biocide | 0.5% |
| Flexiverse III Black 7 - LGD 2000 | Pigment dispersion | Black pigment dispersion | 1% |
| Total | | | 100% |

For a preparation of 1 kg, 335 g of water were introduced at room temperature in a dissolver DISPERMAT® LC75 (dissolver disc Ø 60 mm), under agitation (stirring speed: 500 rpm). Then, 550 g of Zetpol® 2230LX (Zeon Corporation) were added at the same stirring speed. The % of solid HNBR in Zetpol® 2230LX (Zeon Corporation) represents 40.5% (dry extract), and the % of solid HNBR in the final ink composition is thus of 22% by weight. After 5 minutes, 100 g of Benzoflex™ 2088 (EASTMAN) were slowly introduced. After 5 minutes under the same stirring speed, 10 g of a black pigmented dispersion Flexiverse III Black 7—LGD 2000 (SunChemical®) were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 2 measured according to this procedure was: 4.7 mPa·s.

Example 3: Preparation of a Comparative Aqueous Peelable Ink Composition (with NBR Instead of HNBR)

A comparative aqueous peelable ink composition comprising the ink ingredients of Table 3 was prepared.

TABLE 3

| Trade name | Chemical name | Function | Composition 3 % by weight |
|---|---|---|---|
| Water | | Solvent | 55% |
| Nipol® LX 531B | NBR (dry extract: 66%) | Film-forming resin | 33% (22% of pure NBR) |
| Benzoflex™ 2088 | Benzoate ester | Plasticizer | 10% |
| PAT®-662/BNF | Polyoxyethylene sorbitan monolaurate | Release agent | 0.50% |
| Acticide PHE | Phenoxyethanol | Biocide | 0.50% |
| Flexiverse III Black 7 - LGD 2000 | Pigment dispersion | Black pigment dispersion | 1% |
| Total | | | 100% |

For a preparation of 1 kg, 550 g of water were introduced at room temperature in a dissolver DISPERMAT® LC75 (dissolver disc Ø 60 mm), under agitation (stirring speed: 500 rpm). Then, 330 g of Nippol® LX 531B (Zeon Corporation) were added at the same stirring speed. The % of solid NBR in Nipol LX 531B (Zeon Corporation) represents 66% (dry extract), and the % of solid NBR in the final ink composition is thus of 22% by weight. After 5 minutes, 100 g of Benzoflex™ 2088 (EASTMAN) were slowly introduced. After 5 minutes, under the same stirring speed, 5 g of PAT®-662/BNF were slowly added. After 5 minutes under the same stirring speed, 10 g of a black pigmented dispersion Flexiverse III Black 7—LGD 2000 (SunChemical®) were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 3 measured according to this procedure was: 3.2 mPa·s.

Example 4: Erasability (Peelability) Performances of the Prepared Aqueous Peelable Ink Compositions Erasability Performance: Measurement of Peelability The peelability (erasing efficiency) is the ability of the eraser to peel correctly the written mark applied on a porous substrate (calligraph notebook: Calligraphe LIGNE 7000, 70 g·m$^{-2}$, 210×297 mm, 80 pages, by Clairefontaine), assessed according to the following method at 23° C. and 50% relative humidity.

The written mark was peeled (or rubbed) with an eraser, i.e. polyether based polyurethane (PTU), just after writing (around 10 seconds after writing), to peel the color of the written mark.

The method is as follows:

Loops were drawn with a pen on the porous substrate, and then peeled in one time back and forth.

The scoring (i.e. the peeling efficiency) is defined as follows:

10: Erasability by peeling of the written mark is very efficient (no remaining written marks).

0: Erasability of the written mark 1 is not efficient (remaining written marks).

The results are indicated in Table 4 below.

Easiness of the Erasability (Peelability): Measurement of Pressure

The requested pressure to erase (or to peel) by rubbing the written mark applied on a porous substrate (calligraph notebook: Calligraphe LIGNE 7000, 70 g·m$^{-2}$, 210×297 mm, 80 pages, by Clairefontaine) was assessed by using the following method at 23° C. and 50% relative humidity.

The written mark was rubbed (or peeled) with an eraser, i.e. polyether based polyurethane (PTU), just after writing (around 10 seconds after writing), to erase the written mark.

The method is as follows:

A line of loops was rubbed, from one side to the other with diagonal movements, by increasing progressively the erasing pressure.

The pressure required was assessed in order to get a satisfactory erasing.

The scoring (easiness of the erasing by peeling of the written mark) is defined as follows:
- 10: Too light pressure is requested to peel the written mark (unwanted erasing may happened).
- 8-9: Light pressure is requested to peel the written mark.
- 6-7: Medium to light pressure is requested to peel of the written mark.
- 5: Medium pressure is requested to peel the written mark.
- 1-4: Strong pressure is requested to peel the written mark.
- 0: Very strong pressure is requested to peel of the written mark.

The results are indicated in Table 4 below.

TABLE 4 comparison of the erasability (peelability) performances of the ink compositions of the disclosure (examples 1 and 2) with the comparative ink composition (example 3)

| Ink compositions | Erasing efficiency of the written mark | Pressure (easiness of the erasing of the written mark) |
|---|---|---|
| Example 1 (disclosure) | 8.5 | 8.5 |
| Example 2 (disclosure) | 7.5 | 8 |
| Example 3 (comparative example) | 6.5 | 7.5 |

As shown in Table 4, the written mark of the ink compositions according to the disclosure (examples 1 and 2) exhibit good results in terms of erasing efficiency (peelability) of the written mark and in terms of easiness of erasing by peeling (low pressure needed).

Comparatively, the written mark obtained with the comparative ink composition of example 3 cannot be peeled correctly, as shown by the low erasing efficiency value. There are more remaining marks on the porous substrate than with the ink compositions of examples 1 and 2. It is observed that the intensity (darkness) of the black written mark obtained with the ink compositions of examples 1 and 2 was good.

When compared to the written mark obtained with the ink compositions of examples 1 and 2, the written mark obtained with the comparative ink composition of example 3 requires more pressure to erase by peeling the written mark.

Example 5: Preparation of a Color-Changing Aqueous Peelable Ink Composition According to the Disclosure An aqueous peelable ink composition according to the present disclosure comprising the ink ingredients of Table 5 was prepared.

TABLE 5

| Trade name | Chemical name | Function | Composition 4 (% by weight) |
|---|---|---|---|
| Water | | Solvent | 28.5% |
| Zetpol® 2230LX | HNBR (dry extract: 40.5%) | Film-forming resin | 55% (22% of pure HNBR) |
| Benzoflex™ 2088 | Benzoate ester | Plasticizer | 10% |

TABLE 5-continued

| Trade name | Chemical name | Function | Composition 4 (% by weight) |
|---|---|---|---|
| PAT®-662/BNF | Polyoxyethylene sorbitan monolaurate | Release agent | 0.5% |
| APE FRE BL 15:3 Disp BPD 0015 | Pigment dispersion | Pigment | 5% |
| Sanolin® Rhodamine B02 | Acid Red 52 | Dye | 0.5% |
| Acticide PHE | Phenoxyethanol | Biocide | 0.5% |
| Total | | | 100% |

For a preparation of 1 kg, 285 g of water were introduced at room temperature in a dissolver DISPERMAT® LC75 (dissolver disc Ø 60 mm), and 5 g of Sanolin® Rhodamine B02 (Clariant) were added under agitation (stirring speed: 500 rpm). Then, 550 g of Zetpol® 2230LX (Zeon Corporation) were added at the same stirring speed. The % of solid HNBR in Zetpol® 2230LX (Zeon Corporation) represents 40.5% (dry extract), and the % of solid HNBR in the final ink composition is thus of 22% by weight. After 5 minutes, 100 g of Benzoflex™ 2088 (EASTMAN) were slowly introduced. After 5 minutes under the same stirring speed, 5 g of PAT®-662/BNF (Würtz) were added. After 5 minutes under the same stirring speed, 50 g of a blue pigmented dispersion APE FRE BL 15:3 Disp BPD 0015 (SunChemical®) were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 5 measured according to this procedure was: 6 mPa·s.

When writing with the ink composition 4 of example 5, the color of the written mark made on the porous substrate is blue (color 1: blue). The written mark was then peeled with an eraser, i.e. polyether based polyurethane (PTU), just after writing (around 10 seconds after writing), to change the initial blue color of the writing mark into a second color (here color 2: pink).

It is observed that color 1 and color 2 are both intense (vivid), and color 1 was easily (low pressure required) and efficiently (good erasing efficiency) peeled.

Example 6: Preparation of an Aqueous Peelable Ink Composition According to the Disclosure An aqueous peelable ink composition according to the present disclosure comprising the ink ingredients of Table 6 was prepared.

TABLE 6

| Trade name | Chemical name | Composition 5 (% by weight) |
|---|---|---|
| Water | | 13.45% |
| Zetpol® 2230LX | HNBR (dry extract: 40.5%) | 22% (8.9% of pure HNBR) |

TABLE 6-continued

| Trade name | Chemical name | Composition 5 (% by weight) |
|---|---|---|
| Europrene ® Latice 084 | SBR (dry extract: 41%) | 22% (9.02% of pure SBR) |
| Urea | Urea | 15% |
| Glycerin | Glycerin | 18% |
| Acticide PHE | Phenoxyethanol | 0.95% |
| Sanolin ® Rhodamine B02 | Acid red 52 | 0.60% |
| Jetsperse AQ Blue 15:3 Dispersion | Pigment dispersion | 8% |
| Total | | 100% |

For a preparation of 1 kg, 134.5 g of water were introduced at room temperature in a dissolver DISPERMAT® LC75 (dissolver disc Ø 60 mm), and 6 g of Sanolin® Rhodamine B02 (Clariant) were added under agitation (stirring speed: 500 rpm). Then, 220 g of Zetpol® 2230LX (Zeon Corporation) were added at the same stirring speed. The % of solid HNBR in Zetpol® 2230LX (Zeon Corporation) represents 40.5% (dry extract), and the % of solid HNBR in the final ink composition is thus of 8.9% by weight. Then, 220 g of Europrene® Latice 084 (Versalis) were added at the same stirring speed. The % of solid SBR in Europrene® Latice 084 (Versalis) represents 41% (dry extract), and the % of solid SBR in the final ink composition is thus of 9.02% by weight. After 5 minutes, 180 g of glycerin (OLEON) were introduced. After 5 minutes under the same stirring speed, 150 g of urea (Brenntag) were added. After 5 minutes under the same stirring speed, 80 g of a blue pigmented dispersion Jetsperse AQ Blue 15:3 Dispersion (Sun Chemical) were added. The mixture was stirred for 5 minutes more. Then, 9.5 g of Acticide PHE were added, and the mixture was stirred for 15 minutes more to obtain the final ink composition.

The viscosity of the aqueous peelable ink composition was measured at 20° C. with a Shell Cup #1 marketed by NORCROSS® Corporation, according to the following procedure:

1. Dip the Shell Cup in the ink composition until the cup is completely filled with ink composition.
2. Take the Shell Cup out of the fluid and start the timer simultaneously.
3. Stop the timer as soon as the fluid does not flow out any more. The time displayed on timer is reported as the Shell Cup viscosity at 20° C. of the fluid.
4. Clean and dry the Shell Cup.
5. Repeat steps 1 to 5 with the same fluid two times.
6. Report the average viscosity of the three measures.
7. Store the Shell Cup at 20° C.

The viscosity of the aqueous peelable ink composition 5 of example 6 measured according to this procedure was: 4.84 mPa·s.

Example 7: Preparation of an Aqueous Peelable Ink Composition According to the Disclosure An aqueous peelable ink composition according to the present disclosure comprising the ink ingredients of Table 7 was prepared.

TABLE 7

| Trade name | Chemical name | Composition 6 % by weight |
|---|---|---|
| Water | | 13.45% |
| Zetpol ® 2230LX | HNBR (dry extract: 40.5%) | 11% (4.46% of pure HNBR) |
| Europrene ® Latice 084 | SBR (dry extract: 41%) | 33% (13.53% of pure SBR) |
| Urea | Urea | 15% |
| Glycerin | Glycerin | 18% |
| Acticide PHE | Phenoxyethanol | 0.95% |
| Sanolin ® Rhodamine B02 | Acid red 52 | 0.60% |
| Jetsperse AQ Blue 15:3 Dispersion | Pigment dispersion | 8% |
| Total | | 100% |

For a preparation of 1 kg, 134.5 g of water were introduced at room temperature in a dissolver DISPERMAT® LC75 (dissolver disc Ø 60 mm), and 6 g of Sanolin® Rhodamine B02 (Clariant) were added under agitation (stirring speed: 500 rpm). Then, 110 g of Zetpol® 2230LX (Zeon Corporation) were added at the same stirring speed. The % of solid HNBR in Zetpol® 2230LX (Zeon Corporation) represents 40.5% (dry extract), and the % of solid HNBR in the final ink composition is thus of 4.46% by weight. Then, 330 g of Europrene® Latice 084 (Versalis) were added at the same stirring speed. The % of solid SBR in Europrene® Latice 084 (Versalis) represents 41% (dry extract), and the % of solid SBR in the final ink composition is thus of 13.53% by weight. After 5 minutes, 180 g of glycerin (OLEON) were introduced. After 5 minutes under the same stirring speed, 150 g of urea (Brenntag) were added. After 5 minutes under the same stirring speed, 80 g of a blue pigmented dispersion Jetsperse AQ Blue 15:3 Dispersion (Sun Chemical) were added. The mixture was stirred for 5 minutes more. Then, 9.5 g of Acticide PHE were added, and the mixture was stirred for 15 minutes more to obtain the final ink composition.

The viscosity of the aqueous peelable ink composition was measured at 20° C. with a Shell Cup #1 marketed by NORCROSS® Corporation, according to the same procedure as described in example 6.

The viscosity of the aqueous peelable ink composition 6 of example 7 measured according to this procedure was: 5.5 mPas.

Example 8: Evaluation of the Erasing Efficiency and of the Easiness of the Erasability of the Prepared Aqueous Peelable Ink Compositions Erasability Performance: Measurement of Erasing Efficiency The erasing efficiency of the first color is the ability of the eraser to peel correctly the written mark and erase the first color applied on a porous substrate (calligraph notebook: Calligraphe LIGNE 7000, 70 g·m$^{-2}$, 210×297 mm, 80 pages, by Clairefontaine), assessed according to the following method at 23° C. and 50% relative humidity.

The written mark was peeled (or rubbed) with an eraser, i.e. polyether based polyurethane (PTU), just after writing (around 10 seconds after writing), to peel the initial color of the written mark and allows it to change from initial color 1 which corresponds to the initial color of the written mark before being peeled (or rubbed) with an eraser (here color 1: blue) into a second color 2 which corresponds to the second color of the written mark after being peeled (or rubbed) with an eraser (here color 2: magenta). Hence, the initial color 1 (here color 1: blue) is removed by peeling with the eraser.

The method is as follow:

Loops were drawn with a pen on the porous substrate, and then peeled in one time back and forth.

The erasing efficiency is visually assessed by evaluating the quality of the second color obtained after peeling by comparing it with the color of the written mark made with a control sample. The control sample has been realized with the ink composition of example 6 without the pigment dispersion.

Hence, the color of the written mark of the control sample corresponds to the target to be achieved as it corresponds to the written mark of the second color obtained without any peeling step.

The scoring (color quality of the written mark after peeling, here color 2: magenta) is defined as follows:
- 5: The color of the written mark after applying on the porous substrate (and after peeling) is the same as the written mark made with the control sample (i.e. it means that the first color has been completely removed).
- 6-10: The color of the written mark after applying on the porous substrate (and after peeling) is darker than the written mark made with the control sample (i.e. it means that part of the initial blue color remains and the obtained second magenta color is darker than the magenta color of the control sample).
- 0-4: The color of the written mark after applying on the porous substrate (and after peeling) is lighter than the written mark made with the control sample (i.e. it means that part of the dye has been removed while peeling the deposit and the obtained second magenta color is lighter (and less vivid) than the magenta color of the control sample).

The results are indicated in Table 8 below.

Easiness of the Erasability (Peelability): Measurement of Pressure

The requested pressure to erase (or to peel) the initial color by rubbing the written mark applied on a porous substrate (calligraph notebook: Calligraphe LIGNE 7000, 70 g·m⁻², 210×297 mm, 80 pages, by Clairefontaine) was assessed by using the following method at 23° C. and 50% relative humidity.

The written mark was rubbed (or peeled) with an eraser, i.e. polyether based polyurethane (PTU), just after writing (around 10 seconds after writing), to erase the written mark.

Hence, the written mark changes from the initial color (here color 1: blue) into a second color (here color 2: magenta).

The method is as follows:

A line of loops was rubbed, from one side to the other with diagonal movements, by increasing progressively the erasing pressure.

The pressure required was assessed in order to get a satisfactory erasing (or peeling) of the initial color.

The scoring (easiness of the erasing by peeling of the written mark of color 1) is defined as follows:
- 10: Too light pressure is requested to peel color 1 of the written mark (unwanted erasing may happened).
- 8-9: Light pressure is requested to peel color 1 of the written mark.
- 6-7: Medium to light pressure is requested to peel color 1 of the written mark
- 5: Medium pressure is requested to peel color 1 of the written mark.
- 1-4: Strong pressure is requested to peel color 1 of the written mark.
- 0: Very strong pressure is requested to peel color 1 of the written mark.

The results are indicated in Table 8 below.

TABLE 8

Erasability (peelability) performances of the ink compositions of the disclosure (examples 6 and 7)

| Ink compositions | Color quality of the second color after peeling (color 2: magenta) | Pressure requirement (easiness of the erasing of color 1) |
| --- | --- | --- |
| Example 6 (disclosure) | 5 | 8 |
| Example 7 (disclosure) | 5 | 9 |

As shown in Table 8, the written mark of the ink compositions according to the disclosure (examples 6 and 7) exhibit good results in terms of color quality of the second color after peeling, in terms of easiness of erasing (low pressure needed) to rub the color 1. Indeed, the ink compositions according to the disclosure (examples 6 and 7) exhibit good efficiency of the erasing by peeling (the initial color 1 of the written mark was efficiently removed). Indeed, the second color obtained after peeling with the ink compositions according to the disclosure (examples 6 and 7) is the same as the color of the control sample.

In addition, the composition according to the disclosure (examples 6 and 7) exhibit good results in terms of cap-off time, in particular more than one day.

The invention claimed is:

1. An ink composition comprising:
   (a) at least one film-forming elastomeric polymer,
   (b) at least one pigment, and
   (c) water,
   wherein the film-forming elastomeric polymer is hydrogenated acrylonitrile butadiene rubber (HNBR).

2. The ink composition according to claim 1, wherein the composition further comprises at least one release agent.

3. The ink composition according to claim 2, wherein the content of release agent ranges from 0.1 to 5% by weight, relative to the total weight of the ink composition.

4. The ink composition according to claim 3, wherein the content of release agent ranges from 0.1 to 3% by weight, relative to the total weight of the ink composition.

5. The ink composition according to claim 2, wherein the release agent is a polyoxyethylene sorbitan ester.

6. The ink composition according to claim 5, wherein the release agent is a polyoxyethylene sorbitan monolaurate.

7. The ink composition according to claim 1, wherein the pigment is a pigment dispersion, wherein the content of pigment dispersion ranges from 0.1 to 10% by weight, relative to the total weight of the ink composition.

8. The ink composition according to claim 7, wherein the content of pigment dispersion ranges from 0.5 to 7% by weight, relative to the total weight of the ink composition.

9. The ink composition according to claim 1, wherein the composition further comprises at least one dye, wherein the total content of the at least one dye ranges from 0.1 to 10% by weight, relative to the total weight of the ink composition.

10. The ink composition according to claim 1, wherein the composition further comprises at least one plasticizer chosen in the group consisting of glycerin, benzoate esters, diisobutyrate esters, and mixtures thereof, and wherein the plasticizer is in a content ranging from 1 to 25% by weight, relative to the total weight of the ink composition.

11. The ink composition according to claim 1, wherein the content of film-forming elastomeric polymer represents at least 8% by weight, relative to the total weight of the ink composition.

12. The ink composition according to claim 11, wherein the content of film-forming elastomeric polymer represents at least 12% by weight, relative to the total weight of the ink composition.

13. The ink composition according to claim 1, wherein the composition further comprises a second film-forming elastomeric polymer chosen from styrene butadiene rubber (SBR).

14. The ink composition according to claim 13, wherein the total content of the second film-forming elastomeric polymer ranges from 3 to 25% by weight, relative to the total weight of the ink composition.

15. The ink composition according to claim 14, wherein the total content of the second film-forming elastomeric polymer ranges from 6 to 20% by weight, relative to the total weight of the ink composition.

16. The ink composition according to claim 1, wherein the composition further comprises at least one additive selected from the group consisting of antimicrobial agents, antifungal agents, dispersing agents, wetting agents, pH regulators, and mixtures thereof.

17. The ink composition according to claim 1, wherein the ink composition is peelable by peeling with a finger or with a friction body, wherein the friction body is an eraser or a tissue.

18. A method for preparing the ink composition according to claim 1, comprising the steps of:
  (i) under stirring, adding the at least one film-forming elastomeric polymer, and at least one dye, to water to form a mixture,
  (ii) under stirring, adding the at least one pigment, and at least one release agent and at least one plasticizer, to the mixture obtained in step (i), and
  (iii) under stirring, adding additives to a resultant mixture obtained in step (ii).

19. A writing instrument containing the ink composition according to claim 1, wherein the writing instrument is a felt-pen, a highlighter, or a marker, wherein the writing instrument comprises an eraser located on a cap or on a non-writing end of the writing instrument.

20. A method for writing on a porous substrate, comprising the step of applying the ink composition according to claim 1 to a porous substrate, selected from the group consisting of paper, printer paper, and cardboard.

* * * * *